(12) United States Patent
Dicke (10) Patent No.: US 7,785,055 B2
(45) Date of Patent: Aug. 31, 2010

(54) THREAD FORMING SCREW

(75) Inventor: Robert Dicke, Ennepetal (DE); Krista Dicke, legal representative, Ennepetal (DE); Nikolas Dicke, legal representative, Annapolis, MD (US); Markus Dicke, legal representative, Frankfurt (DE); Karlotta Dicke, legal representative, Krefeld (DE); Felicia Dicke, legal representative, Krefeld (DE); Ticiana Dicke, legal representative, Krefeld (DE)

(73) Assignee: A-Z Ausrustung und Zubehor GmbH & Co. KG, Hattingen (DE)

( * ) Notice: Subject to any disclaimer, the term of this patent is extended or adjusted under 35 U.S.C. 154(b) by 775 days.

(21) Appl. No.: 10/590,885

(22) PCT Filed: Jan. 13, 2005

(86) PCT No.: PCT/EP2005/050135

§ 371 (c)(1),
(2), (4) Date: May 17, 2007

(87) PCT Pub. No.: WO2005/080801

PCT Pub. Date: Sep. 1, 2005

(65) Prior Publication Data

US 2008/0019796 A1    Jan. 24, 2008

(30) Foreign Application Priority Data

Feb. 25, 2004   (DE) .................. 20 2004 002 878 U (51) Int. Cl.
*F16B 35/04*    (2006.01)

(52) U.S. Cl. ..................................... 411/411; 411/386
(58) Field of Classification Search ................. 411/411, 411/386, 387.1, 387.4
See application file for complete search history.

(56) References Cited

U.S. PATENT DOCUMENTS 113,006 A * 3/1871 Whiteman .................. 411/386

(Continued)

FOREIGN PATENT DOCUMENTS

DE            84 09 108 U       7/1984

(Continued)

*Primary Examiner*—Flemming Saether
(74) *Attorney, Agent, or Firm*—Brinks Hofer Gilson & Lione (57) ABSTRACT

The invention relates to a screw (1) having a threaded shank (2) and a screw tip (6). The threaded shank (2) is composed of a shank core (10) and a thread which extends helically over the shank core (10). Two flanks (15, 16) which converge in an outer thread edge (14) has a height (H) measured radially from the shank core (10) to the thread edge (14). The thread (12) has a specific apex angle ($\alpha$) formed between the adjacent flanks (15, 16). Preferably the outer thread edge (14) extends in a wave form in the radial direction with an amplitude (U) between wave crests (20) forming indentations (24) which interrupt the surface of the flank (15/16). At least one of the two flanks (15, 16) of the thread (12) is formed concavely in the region between the shank core (10) and the thread edge (14), seen in radial profile, in such a way that the apex angle ($\alpha$) is less than a flank angle ($\alpha_F$). With preference, the thread (12) respectively has in the regions that are not interrupted by indentations (24).

26 Claims, 9 Drawing Sheets

U.S. PATENT DOCUMENTS

| | | | |
|---|---|---|---|
| 1,229,560 A | * | 6/1917 | Bidwell .................. 411/411 |
| 4,527,932 A | * | 7/1985 | Onasch et al. ............. 411/411 |
| 4,536,117 A | * | 8/1985 | Yamashiro ................ 411/411 |
| 5,544,993 A | * | 8/1996 | Harle ...................... 411/414 |
| 5,704,750 A | * | 1/1998 | Bartos et al. .............. 411/411 |
| 5,800,107 A | * | 9/1998 | Giannuzzi et al. ......... 411/386 |
| 6,158,939 A | * | 12/2000 | Grossberndt et al. ...... 411/411 |

FOREIGN PATENT DOCUMENTS

| | | |
|---|---|---|
| DE | 33 35 092 C2 | 8/1985 |
| EP | 0 394 719 B1 | 9/1992 |
| EP | 0893 611 A1 | 1/1999 |

\* cited by examiner

THREAD FORMING SCREW

CROSS REFERENCE TO RELATED APPLICATIONS

This application claims priority to PCT/EP2005/050135, filed Jan. 13, 2005 and German Utility Model 20 2004 002 878.6, filed Feb. 25, 2004.

FIELD OF THE INVENTION

The present invention relates to a screw comprising a threaded shank with a force application location for transmitting torque and a screw. The threaded shank of the screw being composed of a shank core and an automatically thread-forming (i.e. seof-tapping) thread, and the thread being formed as an elevation which extends helically over the shank core. The thread is delimited by two flanks which converge in an outer thread edge and has a height measured radially between the shank core and the thread edge, the thread having, seen in profile, at the thread edge a specific apex angle formed between the flanks.

BACKGROUND AND SUMMARY OF THE INVENTION

A screw of the general type mentioned above is described in DE 33 35 092 A1. It has proven very successful in practice, because a high unscrewing torque is achieved with a low screwing-in torque. In the case of this known screw, at least in a partial region of the thread, the outer thread edge extends in a wave form in the radial direction with a specific amplitude between wave crests with the thread height and wave troughs with a height reduced by the amplitude. In this case, the thread has, at least in the region of one of its flanks, in the region of the wave troughs of the thread edge indentations which interrupt the surface of the flank and the outer delimitation of which is the thread edge. In the regions of the wave crests of the thread edge that are not interrupted by indentations, a first apex angle is formed between the flanks extending in a straight line between the lowest point of the thread on the core and the thread edge, while a second, greater apex angle is formed in the lowest regions of the wave troughs. The thread extends up to the end of the screw tip, it being configured with the indentations and the waved thread edge from the screw tip, at least over the first adjoining turn of the thread. As a result, the tip acts as a kind of abrasive tool, the thread forming taking place directly at the tip of the screw, so that reliable centering and engagement with the workpiece are provided immediately when the screw is applied. In the case of this known screw, the indentations are formed symmetrically in relation to the center line of the waved thread edge as symmetrical paraboloids.

EP 0 394 719 B1 describes a similar thread-forming screw, in which however indentations on the flanks are formed asymmetrically in such a way that their front flank faces, in the screwing-in direction, extend more steeply than the rear flank faces, in the screwing-in direction. As a result, a further reduction of the screwing-in torque is achieved with at the same time an increase in the unscrewing torque. When screwing in, the resistance is less as result of the flatter configuration of the rear parabola parts in the screwing-in direction, whereas the unscrewing of the screw is made more difficult on account of the steeper arrangement of the parabola faces lying at the front in the screwing-in direction.

The present invention is based on the object of improving a screw of the generic type described above in such a way that the screwing-in torque is further reduced. At the same time, the screw is intended to be designed universally for screwing into various materials including softer materials, such as wood and the like, without pre-drilling and consequently automatically forming a hole, and harder materials, for example plastics and metals, into a pre-drilled hole.

The screw of this invention includes at least one of the two flanks of the thread being formed concavely in the region between the shank core and the thread edge, seen in radial profile, in such a way that the apex angle is less than a flank angle enclosed between imaginary straight flank lines defined in each case by a lowest point of the thread and the thread edge. Consequently, according to the invention, the apex angle is smaller than in the prior art, resulting in a more slender thread profile, so that the tapping torque when screwing in is favorably induced, in that the thread more easily forms a counter-thread in the respective material with material displacement, i.e. substantially without chips being formed. However, in spite of the slenderness of the thread profile, good mechanical strength is ensured by the thread profile according to the invention, because the lowest point of the thread is configured with a relatively great width.

In an advantageous configuration of the invention, the thread may be formed (in a way corresponding to the aforementioned prior art) with a waved thread edge and indentations on at least one flank, a more slender, second apex angle also being formed in the region of the wave troughs. In this case, an angular difference between the first and second apex angles should be as small as possible or even zero, i.e. the second apex angle in the region of the wave troughs and the indentations should also be as small as possible, in order to keep the tapping torque low by the slender profile shape. A continuous transition, virtually without any edge, between the thread flanks and the indentations is also advantageous here.

In addition or as an alternative to the configuration described above, it is envisaged to vary the size of the amplitude of the waved thread edge in dependence on different intended uses of the screw. For use for screwing into softer materials, such as wood or other fibrous materials and composite materials, the amplitude of the waved thread edge is approximately 0.2 to 0.4 times the thread height. The softer or more yielding the material is, the greater the amplitude can be (and vice versa). For use for screwing into harder materials, in particular plastics or metals, it is provided that the amplitude of the thread edge is approximately 0.05 to 0.15 times the thread height. The harder and more resistant the material is, the smaller the amplitude should be (and vice versa). Furthermore, for use as a "universal screw" for use with soft and hard materials, the amplitude may also be approximately 0.1 to 0.3 times the thread height.

In the screws of this invention, a further advantageous measure relates to the radially measured depth of the indentations. For use for screwing into softer materials, the depth of the indentations is preferably equal to our greater than 0.8 time the thread height. This factor may advantageously be approximately 0.8, but also may tend toward 1.0. For harder materials, the radial depth of the indentations is preferably approximately 0.2 to 0.3 times the thread height. For universal use, the depth may also be approximately 0.3 to 0.8 times the thread height.

The number of wave crests and wave troughs per turn of the thread, i.e. the circumferential angular spacing or pitch angle of the wave crests, also has a further influence on the properties of the screw of this invention. For use for screwing into softer materials, the pitch angle should lie in the range from 30° to 45°, resulting in a number n of 8 to 12 wave crests or wave troughs per turn of the thread (360°). For use in the case of harder materials, the pitch angle preferably lies in the range from 15° to 24°, resulting in a number n of 15 to 24 wave crests or troughs. For a design as a "universal screw" for soft and hard materials, the pitch angle may lie in the range from 20° to 35° (n=10 to 18).

In particular in conjunction with one or more of the features explained, it is advantageous if the thread, configured in practice as a one-start thread, has a lead which is approximately 0.5 times the outer thread diameter (nominal screw diameter). This achieves an increased thrust for quicker screwing in. Nevertheless, a high unscrewing torque is ensured for durable screwing prestress.

Further advantageous configurations of the invention are contained in further claims and the description which follows.

It should be noted at this point that all the features and measures described here can be used independently of one another or else in any possible or meaningful combination with one another.

BRIEF DESCRIPTION OF THE DRAWINGS

The invention is to be explained more precisely on the basis of several exemplary embodiments that are illustrated in the drawing, in which.

DETAILED DESCRIPTION OF THE INVENTION

In the various figures of the drawing, the same parts are always provided with the same reference numerals and are therefore generally also only described once in each case.

As can be seen initially from FIGS. 1 to 6, a screw 1 according to the invention is composed of a threaded shank 2 with a torque application feature 4 at one end, for transmitting torque, and an opposite screw tip 6. In the example represented, the torque application feature 4 is in the form of a depression, as an internal force application location—here purely by way of example as a cross "Philips" slit—in a screw head 8 formed as a recessed head. The threaded shank 2 is composed of a preferably cylindrical shank core 10 with a core diameter d (see also FIG. 7) and an automatically thread-forming, in particular one-start, thread 12 with an outer thread diameter (nominal screw diameter) D (FIGS. 1, 6 and 7), this thread 12 being formed as an (only single) elevation which extends helically at least over part of the shank core 10 and over the screw tip 6 and is defined by two flanks 15, 16 which converge in an outer thread edge 14. The thread 12 extends here in any event up to the front, pointed end 18 of the screw tip 6. In the example represented, it extends over the entire shank core 10, almost up to the screw head 8 (a so-called full thread). The screw 1 may, however, also be formed with a partial thread, i.e. with a thread-free shank portion adjoining the screw head 8. The thread 12 is usually formed as a right-hand thread, so that a screwing-in direction (arrow E) corresponds to the clockwise sense. The opposite unscrewing direction is depicted by arrow A. In the region of the screw tip 6, the core 10 tapers approximately conically from the core diameter d to the pointed end 18.

As revealed in particular by FIGS. 2 to 5, the thread 12 has a height H, measured radially from the shank core 10 to the thread edge 14. Furthermore, the thread 12 has, seen in profile (see in particular FIGS. 2 and 4), at the thread edge 14 a specific apex angle α formed between the adjacent flanks 15, 16.

According to the invention, it is provided here that at least one of the two flanks 15, 16 of the thread 12 is formed concavely in the region between the shank core 10 and the thread edge 14, seen in profile or radial cross section, in such a way that the apex angle α formed in the region of the thread edge 14 by the adjacent flanks 15, 16 is in any event less than a so-called flank angle $α_F$, which is defined between imaginary straight flank lines FG extending in each case through a lowest point GF of the thread and the thread edge 14.

In the preferred exemplary embodiments, both flanks 15 and 16 are correspondingly concavely formed, to be precise preferably in the same manner, i.e. symmetrically in relation to a profile center plane.

Figure 2:
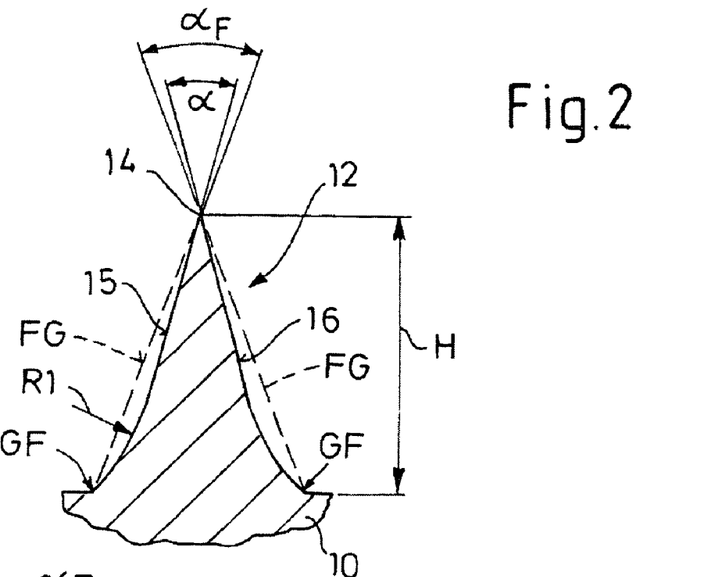
FIG. 2 shows a further enlarged view of the thread profile in the radial sectional plane II-II from FIG. 1.
Figure 3:
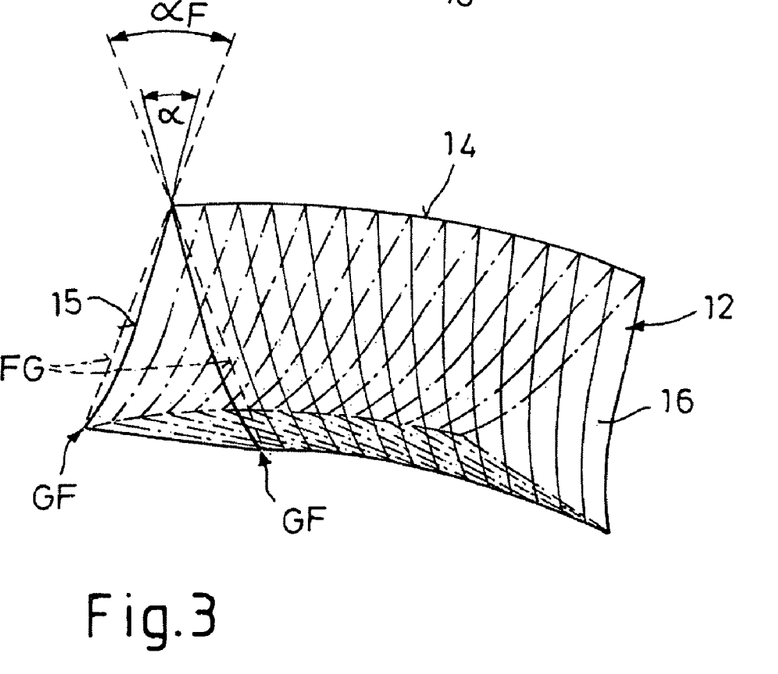
FIG. 3 shows a schematic perspective view of a portion of the thread in the configuration according to FIG. 2.

In the case of the embodiment according to FIGS. 2 and 3, each flank 15, 16 extends in a concavely curved manner, at least over part of the radial height H, from the shank core 10 or from the lowest point GF of the thread. This is illustrated in FIG. 2 by a radius of curvature R1, but instead of the form of an arc of a circle, any other curved form is possible, for example a parabolic curve. According to the invention, the term "concave" consequently covers any desired curved forms, i.e. not only continuous curved curves but also discontinuous curves comprising curved and/or straight portions which respectively merge into one another over obtuse angles. All that matters is that the angle α is less than the flank angle $α_F$.

Figure 4:
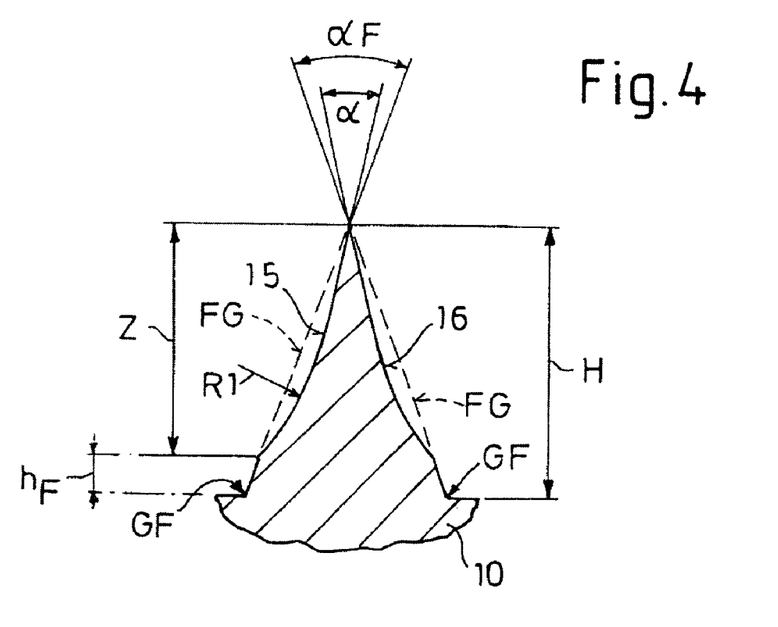
FIG. 4 shows a view of the profile analogous to FIG. 2 in a configurational variant.
Figure 5:
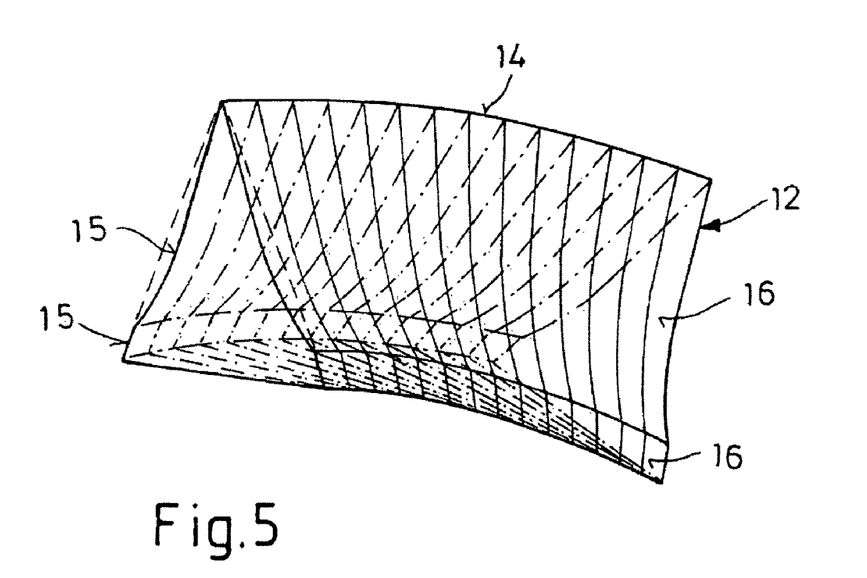
FIG. 5 shows a view as in FIG. 3 with respect to the configuration according to FIG. 4.

In the case of the configurational variant according to FIGS. 4 and 5, each flank 15, 16 extends initially in a straight line from the shank core 10 or from the lowest point GF of the thread, corresponding to the imaginary straight flank line FG, and only extends concavely above a specific flank height $h_F$. The concave portion of each flank 15, 16 then extends over the remaining height Z ($Z=H-h_F$).

In both configurations, the flanks 15, 16 can substantially extend virtually in a straight line in an outer partial region adjoining the thread edge 14, seen in profile.

Preferably, the apex angle α that is reduced with respect to the flank angle $α_F$ lies approximately in the range from 25° to a maximum of 35°.

As revealed by FIGS. 6 to 15, in another preferred configuration of the invention the outer thread edge 14—at least in a partial region of the thread 12—extends in a wave form in the radial direction with a specific amplitude U between wave crests 20 and wave troughs 22. In the region of the wave crests 20, the thread 12 has the height H, measured radially between the shank core 10 and the thread edge 14. This height H is reduced in the region of the wave troughs 22 by the amplitude U to a height h. It follows from this that: U=H–h. The thread 12 has, at least in the region of one of the flanks 15, 16, in particular at least in the region of the flank 16 facing the screw tip 6 or 18, in the region of the wave troughs 22 of the thread edge 14 indentations 24, which interrupt the surface of the respective flank 15, 16 and the outer radial delimitation of which is the thread edge 14. These indentations 24 have surfaces which extend in a curved manner, in particular concavely in radial directions (see FIGS. 8 and 10) and likewise concavely in the circumferential or rotational direction of the screw. It is further revealed in particular by FIGS. 8 to 11 that the thread 12 respectively has in the regions of the wave crests 20 of the thread edge 14 that are not interrupted by indentations 24 the specific, first apex angle α, formed between the flanks 15, 16 extending concavely in the radial direction, and a second apex angle α', in the lowest regions of the wave troughs 22 of the thread edge 14 in the region of the indentations 24.

In the case of a type of configuration that is not represented, the surfaces of the indentations 24 may extend substantially in a straight line, seen in the radial direction. This would have the result that the second apex angle α' is in any event greater than the first apex angle α; the second apex angle α' should then be approximately 30° to a maximum of 58°, but in the interests of a low tapping torque should be as small as possible.

Figure 8:
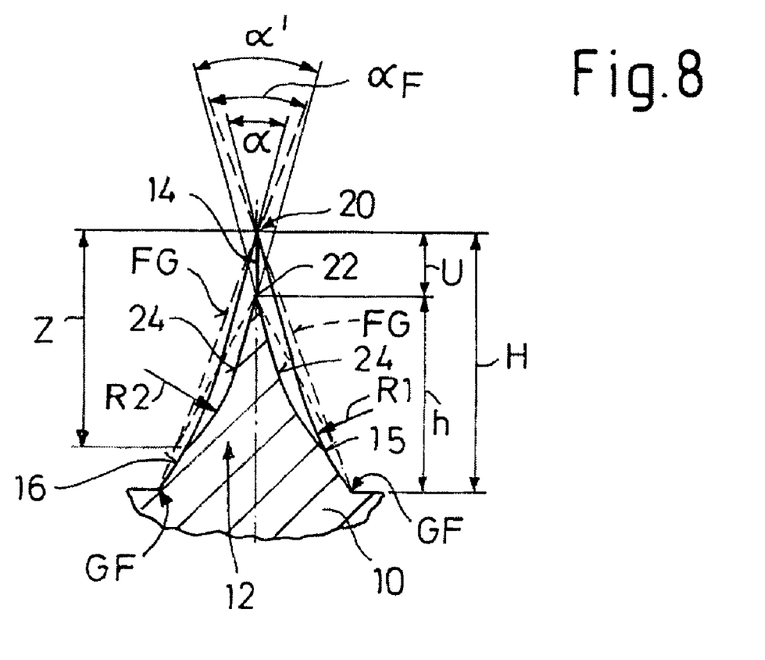
FIG. 8 shows an enlarged view of the thread profile, i.e. a cross section through the thread in the region of a wave trough in the plane VII-VII of FIG. 7.
Figure 9:
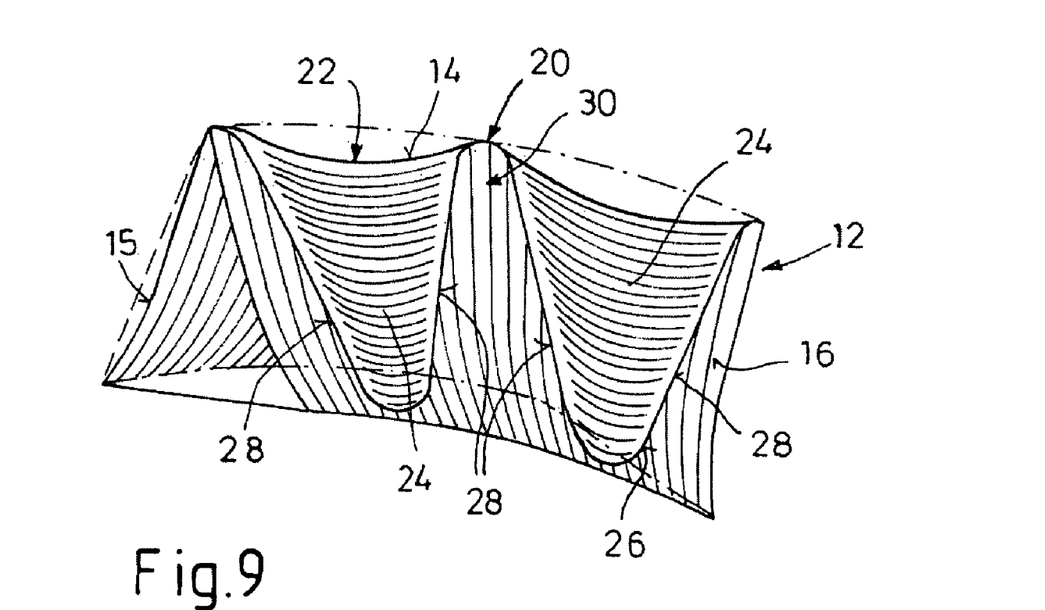
FIG. 9 shows a representation of the thread analogous to FIG. 3 or 5 similar to the configuration according to FIG. 8.
Figure 10:
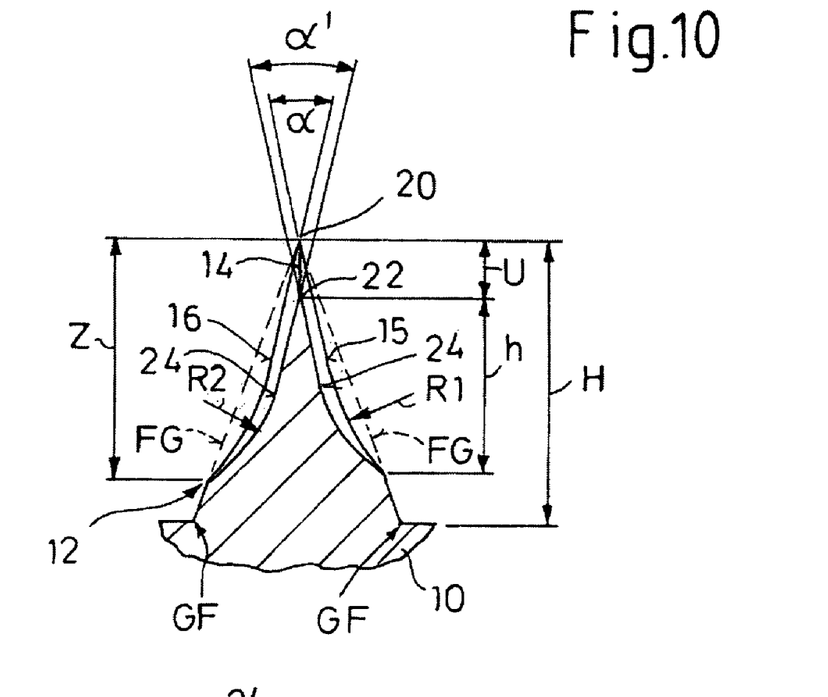
FIG. 10 shows a representation analogous to FIG. 8 in a configurational alternative.
Figure 11:
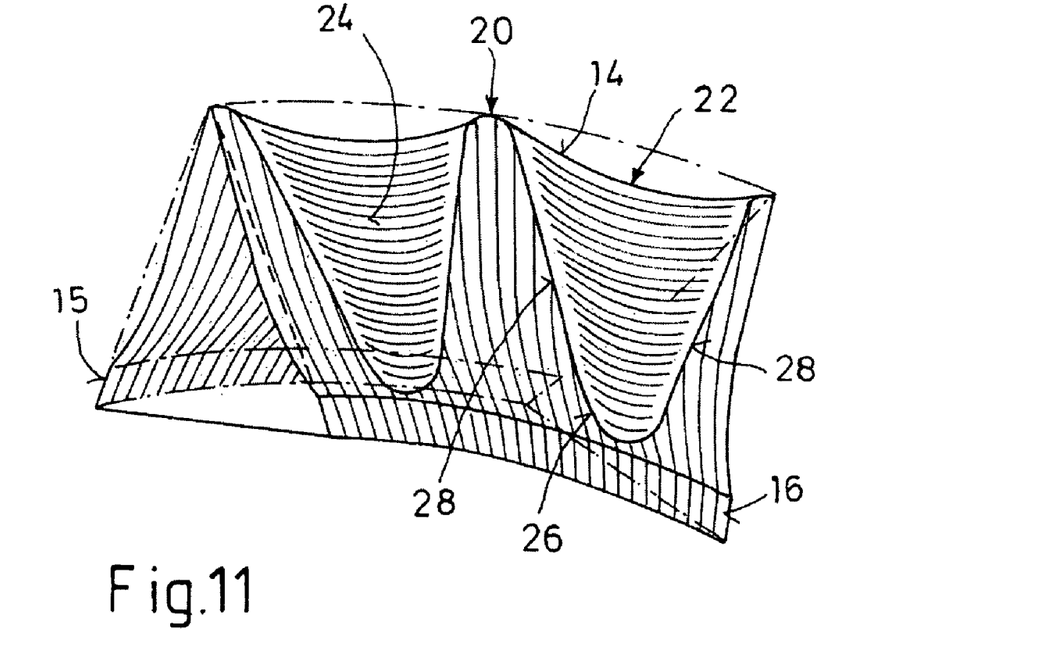
FIG. 11 shows a representation of the thread as in FIG. 9 with respect to the configuration according to FIG. 10.

In the case of the advantageous embodiments represented, however, the surfaces of the indentations 24 are in each case concave in the radial direction, at least over part of the radial extent, which is indicated in FIGS. 8 and 10 by way of example with a radius of curvature R2. Here, too, however, this does not have to be the curvature of an arc of a circle, but any desired curved forms are possible, for example parabolic curved forms or curved forms comprising a number of straight portions. This configuration has the advantage that the second apex angle α', obtained in the wave trough 22 at the thread edge 14 effectively between applied tangents, can still be reduced significantly by a suitable form of curvature. According to FIGS. 8 and 10, α and α' are of approximately the same size; they may, for example, both be of the order of magnitude of preferably 25° to 35°.

A further important aspect is the size of the amplitude U of the waved thread edge 14. For a design of the screw 1 for use for screwing into softer materials, such as wood or the like, the amplitude U should be approximately 0.2 to 0.4 times the thread height H. This can be mathematically expressed by the relationship U=Y·H, where Y=0.2 to 0.4. In this respect, reference is made to the configurations illustrated in FIGS. 7, 12 and 13.

By contrast, the amplitude U for use of the screw 1 for screwing into harder and more resistant materials, in particular plastics or metals, is approximately 0.05 to 0.15 times the height H, i.e., in the stated relationship U=Y·H, we have Y=0.05 to 0.15. In this respect, reference is made to the configurations according to FIGS. 14 and 15.

In a configuration of the screw 1 that is not represented by a Figure, for universal use in the case of various types of materials, the amplitude U of the thread edge 14 may be approximately 0.1 to 0.3 times the thread height H.

Figure 7:
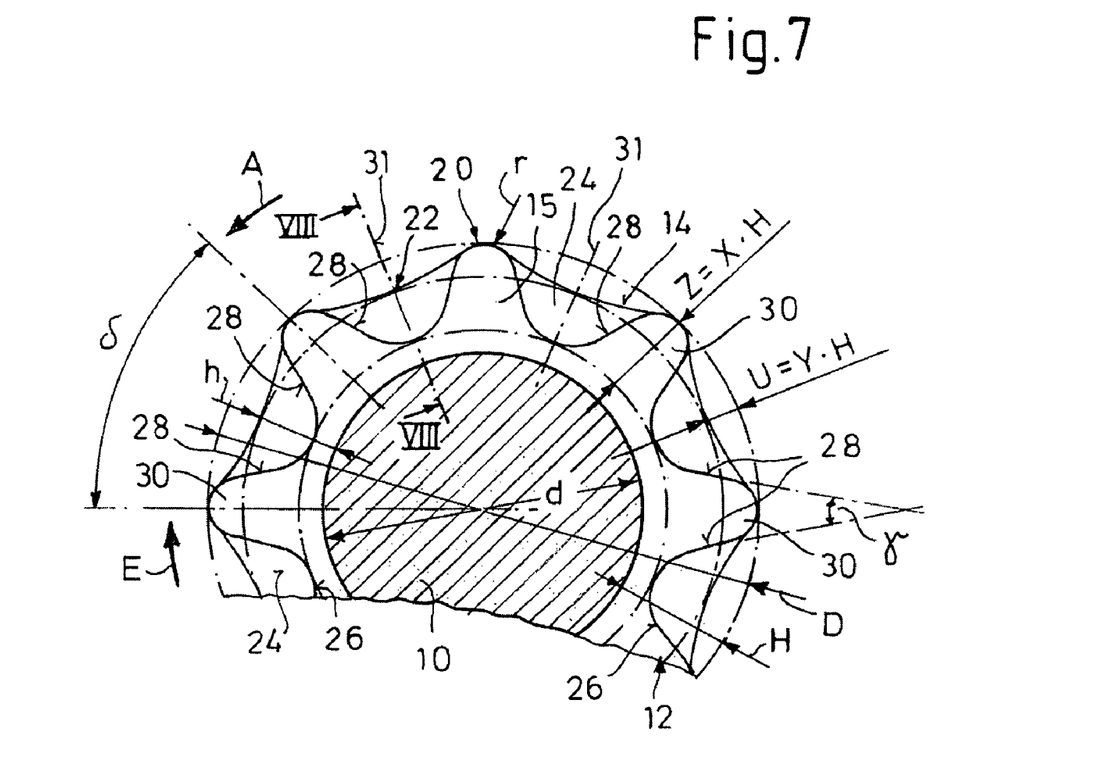
FIG. 7 shows a further enlarged cross section in the plane VII-VII of FIG. 6, in particular for use in the case of softer materials.

As further revealed by the figures of the drawing, in particular FIGS. 7, 8 and 10, the indentations 24 have in each case a depth Z, which is measured inward in the radial direction from the thread diameter D determined by the wave crests 20 of the thread edge 14 and is in any event at least slightly less than the height H of the thread 12. As a result, the thread 12 has in the region of its lowest point flanks 15, 16 that are uninterrupted over a specific height H-Z.

According to a further aspect of the invention, this depth Z of the indentations 24 is likewise designed to match the use of the screw 1. For softer materials, the depth Z of the indentations 24 is to be at least 0.8 times the thread height H; this gives Z=X·H with X≧0.8. In this case, Z may also tend toward H, cf. the configurations according to FIGS. 12 and 13.

Figure 14:
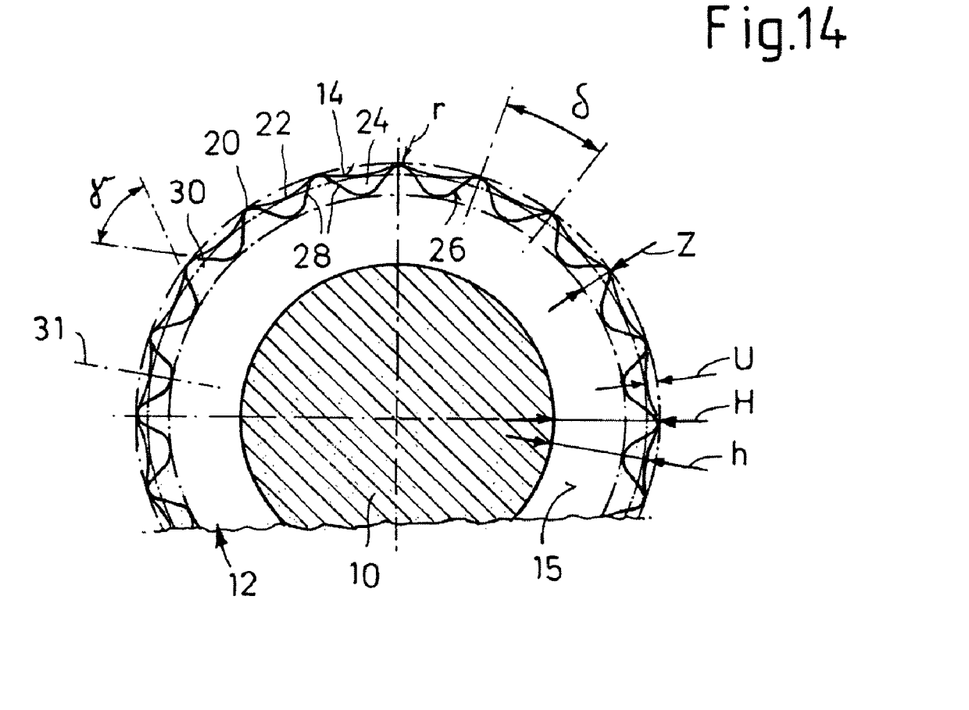
FIG. 14 shows an embodiment designed for use in particular in the case of harder materials, in a representation analogous in part to FIG. 7, with symmetrical indentations.
Figure 15:
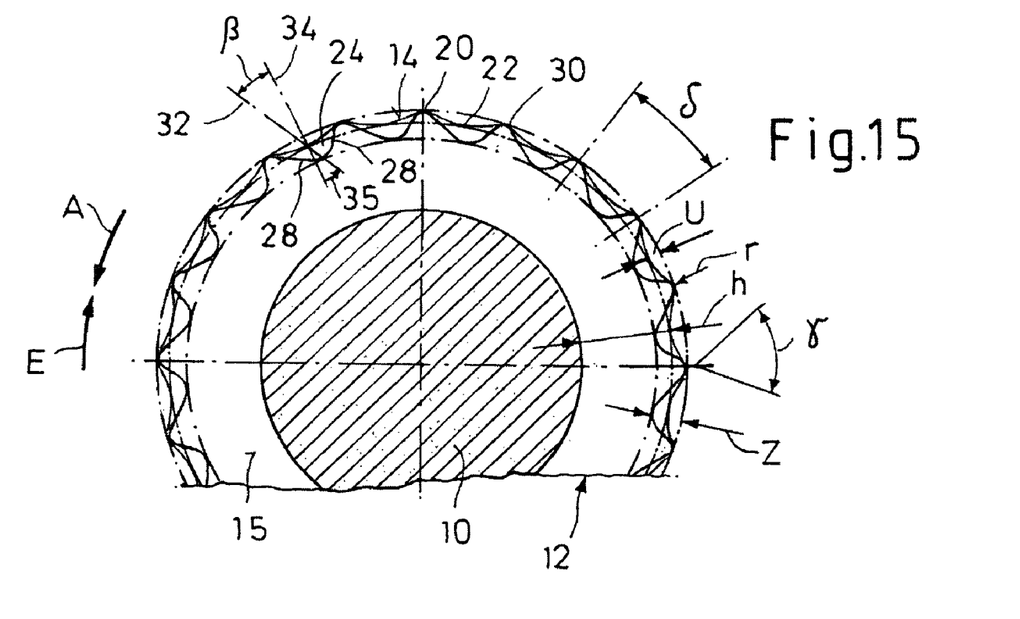
FIG. 15 shows a configuration analogous to FIG. 14, but with asymmetrical indentations.

In the case of configurations for harder materials, compare FIGS. 14 and 15, in the stated relationship Z=X·H, the factor X is approximately 0.2 to 0.3.

For universal use in the case of various materials, the radial depth Z of the indentations 24 may also be approximately 0.3 to 0.8 times the thread height H.

Yet a further important aspect relates to the number of wave crests 20 or wave troughs 22 per turn of the thread of 360°. The wave crests 20 (correspondingly of course also the wave troughs 22) are spaced apart from one another in the circumferential direction in each case by a pitch angle δ. Here it is then provided according to the invention that, for use for softer materials, the pitch angle δ lies in the range from 30° to 45°. According to the relationship n=360°/δ, n=8 to 12 is obtained for the number of wave crests or wave troughs for softer materials. For a design of the screw 1 for use in the case of harder materials, the pitch angle δ lies in the range from 15° to 24°, so that there is a number n of 15 to 24 wave crests 20 or wave troughs 22 per turn of the thread. For universal use of the screw 1, a configuration in which the pitch angle δ lies approximately in the range from 20° to 35° may be provided. This would result in a number n of approximately 10 to 18 wave crests 20 or wave troughs 22 per turn of the thread.

The indentations 24 are in each case delimited from the adjacent face of the respective flank 15, 16 by a limiting line 26. In this case, this limiting line 26 has substantially the form of a parabola with lateral, approximately V-shaped limiting portions. This contour has the effect that a thread portion 30 with complete flanks 15, 16 is respectively formed between two neighboring indentations 24 in the region of the wave crests 20. The limiting portions 28 of the neighboring indentations 24 that lie on both sides of each such complete thread portion 30 here enclose an angle γ, which should lie in the range from 30° to 90°, the limiting portions 28 merging with one another in the region of each wave crest 20 over a rounding with a radius r=(0.1 to 0.3)·H.

Figure 12:
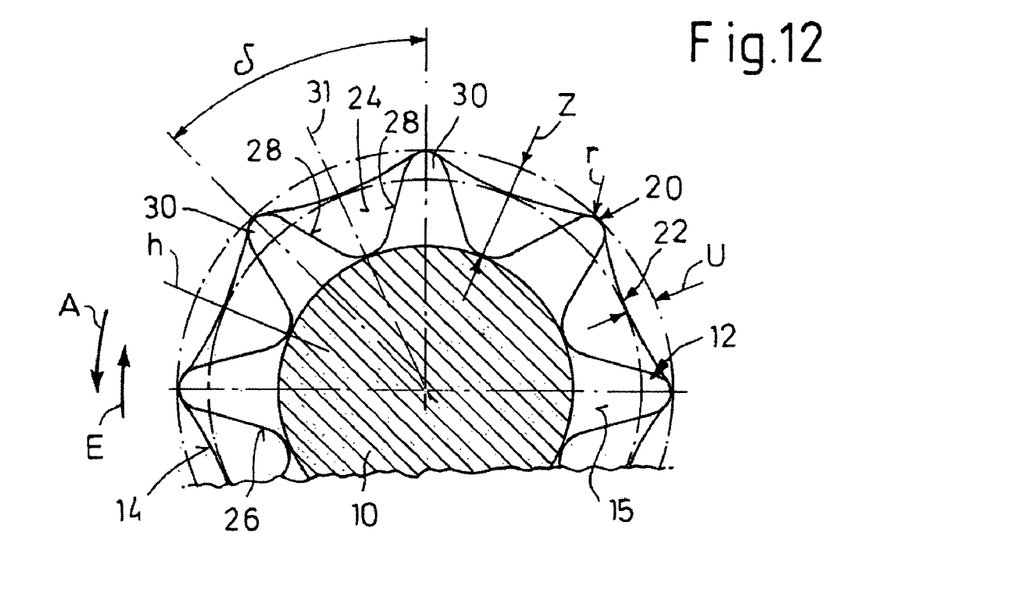
FIG. 12 shows a representation analogous to FIG. 7 of a further configuration, for softer materials.

In the case of the configurations according to FIGS. 7, 12 and 14, the indentations 24 are in each case symmetrically formed in such a way that their lateral limiting portions 28 extend in each case at the same angle to a radial axis 31 of the indentation 24 in the screwing-in direction E and unscrewing direction A of the screw.

Figure 13:
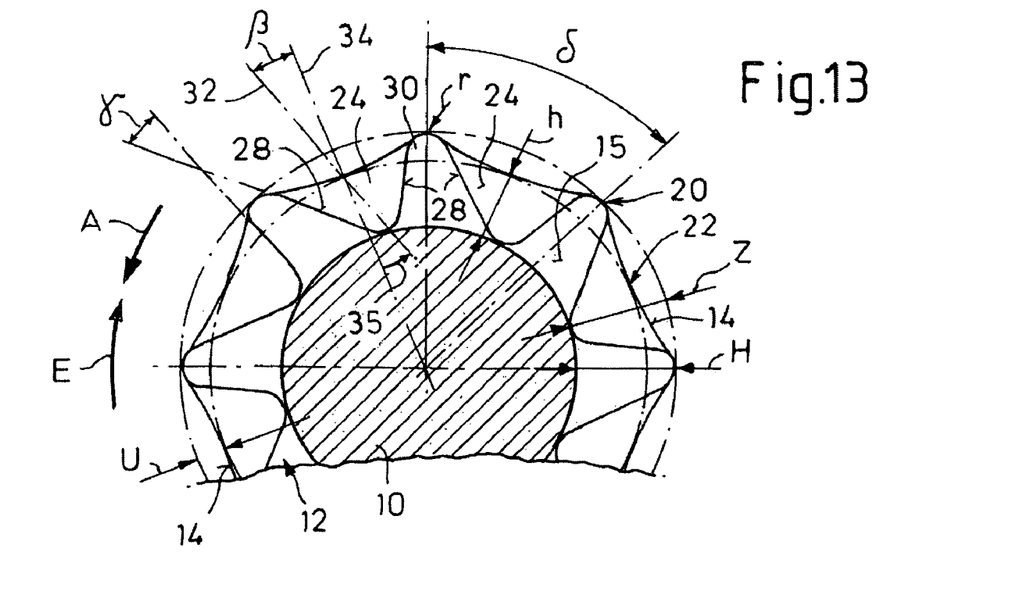
FIG. 13 shows a further configuration, for use with softer materials, in a representation analogous to FIG. 7 or 12, but with asymmetrical indentations.

By contrast, in the case of the configurations according to FIGS. 13 and 15, it is provided that each indentation 24 is asymmetrically formed in such a way that the front limiting line 26 in the screwing-in direction E extends more steeply than the rear limiting line 26, an axis 32 of the indentation 24 being offset in relation to a radial center line 34 of the wave trough 22 of the thread edge 14 by an acute angle β in the screwing-in direction E (see in this respect the arrow 35 respectively depicted in FIGS. 13 and 15). The angle β should lie approximately in the range from 10° to 25°.

Figure 6:
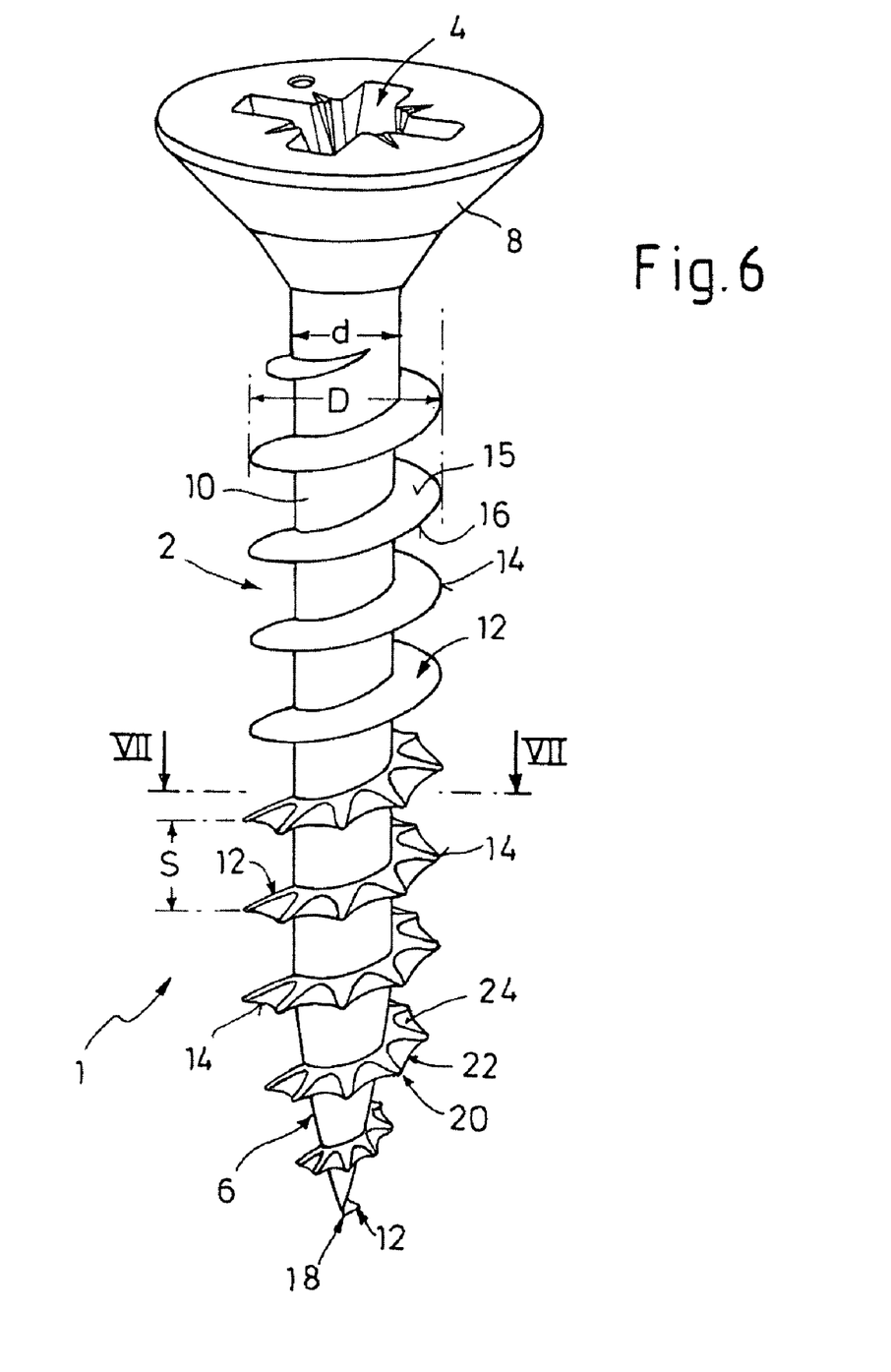
FIG. 6 shows an enlarged, slightly perspective side view of a screw according to the invention in an advantageous configuration.

In an advantageous configuration of the screw 1 according to the invention, the thread 12, which according to FIG. 6 extends up to the end 18 of the screw tip 6, is configured from the end 18 and over the screw tip 6 as well as at least over the first turn of the thread adjoining the region of the cylindrical core 10 with the indentations 24 and the waved thread edge 14. Furthermore, the indentations 24 are formed with preference lying axially opposite one another on both flanks 15 and 16 of the thread 12. In the region of the screw tip 6, the spacing of the indentations 24 or the complete thread portions 30 may become successively smaller and smaller toward its end 18.

Figure 1:
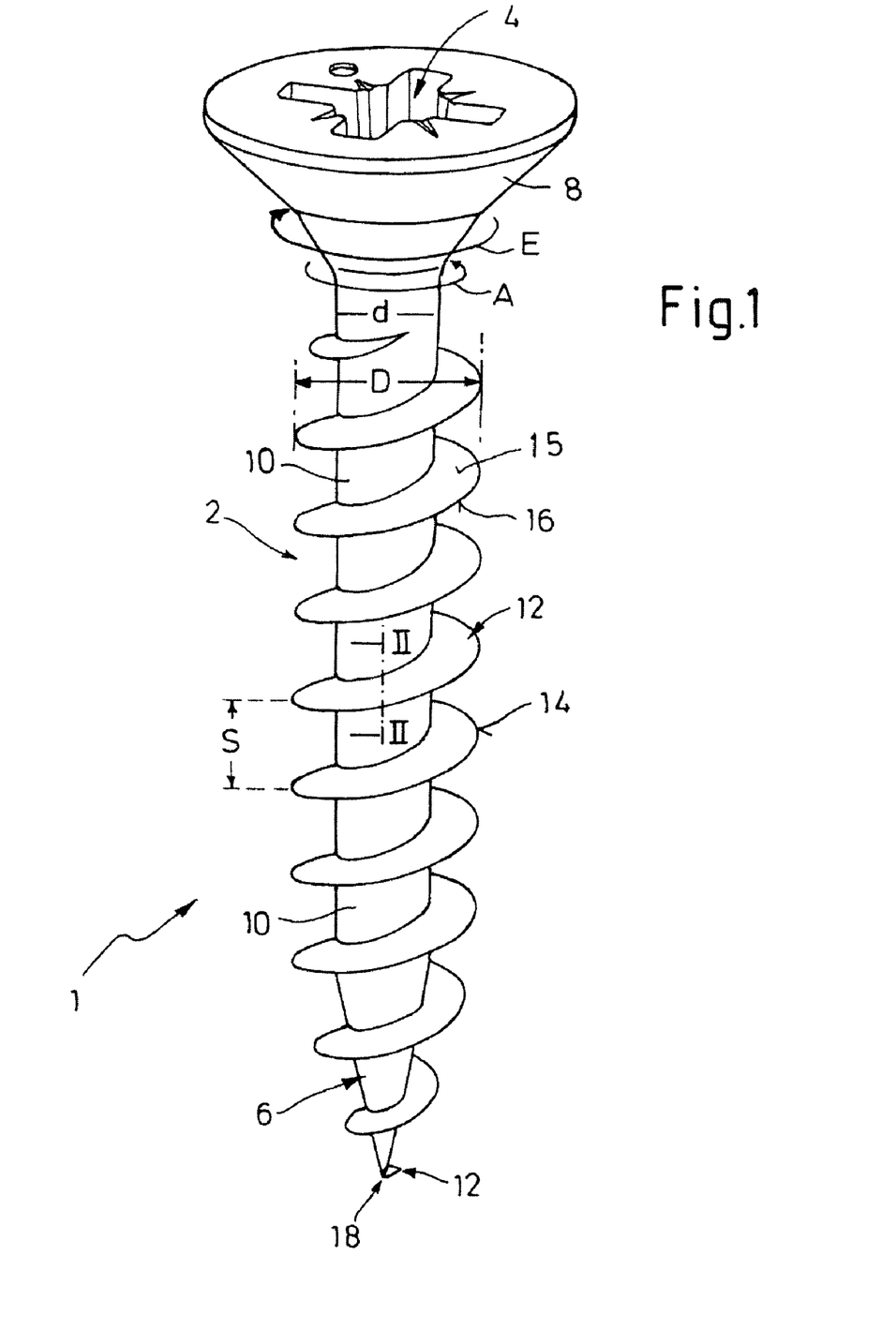
FIG. 1 shows an enlarged, slightly perspective side view of a screw according to a first embodiment of the invention.

As also revealed by FIGS. 1 and 6, with preference the thread 12 is configured in practice as a one-start thread with a lead S which, on account of the features according to the invention, may be relatively large with approximately 0.5 times the thread diameter D. It is also advantageous if the screw tip 6 is formed as a "piercing tip". In particular in the case of the configuration according to FIGS. 6 to 15, this is already achieved to a certain extent just by the described configuration of the thread 12 extending up to the pointed end 18, since this has the result that, during rotation, the tip 6 acts as a kind of abrasive tool. In addition, the core of the tip 6 may for example have e.g. axial, rib-shaped milling elements (milling ribs) that are not represented.

Finally, it should be noted that deviations from the ideal configurational features described and represented here may arise in practice, in particular for production reasons. This applies in particular to the course of the thread edge 14 and/or the limiting lines 26, which, as a departure from the sinusoidal representation, may also be created e.g. with approximately straight portions in the region of the wave troughs and/or with an irregular course. Furthermore, instead of being formed with a sharp tip, like a knife edge, the thread edge 14 may also be formed between the flanks with a narrow surface or with a small radius of curvature.

While the above description constitutes the preferred embodiment of the present invention, it will be appreciated that the invention is susceptible to modification, variation, and change without departing from the proper scope and fair meaning of the accompanying claims.

The invention claimed is:

1. A screw comprising a threaded shank with a torque application feature for transmitting torque and a screw tip, the threaded shank being composed of a shank core and a thread-forming thread, and the thread being formed as an elevation which extends helically over the shank core, and forms two flanks which converge at an outer thread edge and has a height H measured radially from the shank core to the thread edge, the thread having, as viewed in radial profile, at the thread edge a specific apex angle α formed between the adjacent flanks, at least one of the two flanks of the thread is formed concavely in the region between the shank core and the thread edge, as viewed in radial profile, in such a way that the apex angle α is less than a flank angle $α_F$ defined between imaginary straight flank lines FG formed by a lowest point GF of the thread and the thread edge, wherein one or both of the flanks extend initially in a straight line from the shank core, corresponding to the straight flank line FG, and only extends concavely from a specific flank height $h_F$.

2. The screw as claimed in claim 1, wherein both of the flanks are concavely formed.

3. The screw as claimed in claim 1, wherein the flanks extend substantially in a straight line in an outer partial region adjoining the thread edge as viewed in profile.

4. The screw as claimed in claim 1, wherein the apex angle α lies approximately in the range from 25° to 35°.

5. The screw as claimed in claim 1, wherein at least in a partial region of the thread, the outer thread edge extends in a wave form in the radial direction with an amplitude U between wave crests with the thread height H and wave troughs with a height h reduced by the amplitude U, and the thread has, at least in the region of one of the flanks, in the region of the wave troughs of the thread edge, indentations which interrupt the surface of the flank and the outer boundary of which is the thread edge, the thread respectively having in the regions of the wave crests of the thread edge that are not interrupted by the indentations the apex angle α defining a first apex angle, formed between the flanks, and a second apex angle α', in the lowest region of the wave troughs of the thread edge.

6. The screw as claimed in claim 5, wherein the indentations have surfaces extending substantially in a straight line, seen in the radial direction, in the profile of the thread the second apex angle α' being greater than the first apex angle α and lying approximately in the range from 30° to a maximum of 58°.

7. The screw as claimed in claim 5, wherein the indentations have, as viewed in profile, concave surfaces, at least in certain portions thereof, the second apex angle α' being of approximately the same order of magnitude as the first apex angle α.

8. The screw as claimed in claim 5, for use for screwing into softer materials including wood or wood-like materials, the amplitude U of the waved thread edge is approximately 0.2 to 0.4 times the thread height H.

9. The screw as claimed in claim 5, for use for screwing into harder materials, including plastics or metals, the amplitude U of the waved thread edge is approximately 0.05 to 0.15 times the thread height H.

10. The screw as claimed in claim 5, for universal use for screwing into various materials, the amplitude U of the waved thread edge is approximately 0.1 to 0.3 times the thread height H.

11. The screw as claimed in claim 5, wherein the indentations have in each case a depth Z, which is measured inward in the radial direction from a diameter D determined by the wave crests of the thread edge and is less than or equal to the height H of the thread.

12. The screw as claimed in claim 11, for use for screwing into softer materials, including wood or wood-like materials, the radial depth Z of the indentations is approximately 0.8 to 1 times the thread height H.

13. The screw as claimed in claim 11, for use for screwing into harder or more resistant materials, including plastics or metals, the radial depth Z of the indentations is approximately 0.2 to 0.3 times the thread height H.

14. The screw as claimed in claim 11, for universal use for screwing into various materials, the radial depth Z of the indentations is approximately 0.3 to 0.8 times the thread height H.

15. The screw as claimed in claim 5, wherein the wave crests are spaced apart from one another in the circumferential direction by a pitch angle δ, which, for use for screwing into softer materials, including wood or wood-like materials, lies in the range from 30° to 45°.

16. The screw as claimed in claim 5, wherein the wave crests are spaced apart from one another in the circumferential direction by a pitch angle δ, which, for use for screwing into harder or more resistant materials, including plastics or metals, lies in the range from 15° to 24°.

17. The screw as claimed in claim 5, wherein the wave crests are spaced apart from one another in the circumferential direction by a pitch angle δ, which, for use for screwing into various materials, lies in the range from 20° to 35°.

18. The screw as claimed in claim 5, wherein the indentations are formed from the adjacent face of the flank by a limiting line, the limiting line having substantially the form of a parabola with lateral, approximately V-shaped limiting portions, a thread portion that is uninterrupted with respect to its flanks being respectively formed between two neighboring indentations in the region of the wave crests and the limiting portions that lie on both sides of the thread portion enclosing an angle γ, which lies in the range from 30° to 90°.

19. The screw as claimed in claim 18, wherein the limiting portions merge with one another in the region of each of the wave crests over a rounding with a radius r, which corresponds approximately to 0.1 to 0.3 times the thread height H.

20. The screw as claimed in claim 18, wherein each indentation is symmetrically formed in such a way that its limiting portions extend in each case at the same angle to a radial axis of the indentation in the screwing-in direction E and unscrewing direction A of the screw.

21. The screw as claimed in claim 18, wherein each indentation is asymmetrically formed in such a way that the limiting line forms a front limiting line in the screwing-in direction E which extends more steeply than the limiting line forming a rear limiting line, an axis of the indentation being offset in relation to a radial center line of the wave trough of the thread edge by an acute angle β in the screwing-in direction (E), the angle β being approximately in the range of 10° to 25°.

22. The screw as claimed in claim 5, wherein the thread extends up to a pointed end of the screw tip, the thread being configured with the indentations and the waved thread edge from the screw tip, at least over a first adjoining turn of the thread.

23. The screw as claimed in claim 5, wherein the indentations are formed lying opposite one another on both of the flanks of the thread.

24. The screw as claimed in claim 5, wherein in the region of the screw tip, the spacing of the indentations becomes smaller toward a pointed end of the screw tip.

25. The screw as claimed in claim 1, wherein the thread, configured as a one-start thread, has a lead S which is approximately 0.5 times the outer thread diameter D.

26. The screw as claimed in claim 1, wherein the screw tip is formed with automatically piercing properties.

* * * * *